J. N. Pitts.
Flocking Mach.
Nº 14165. Patented Jan. 29. 1856.
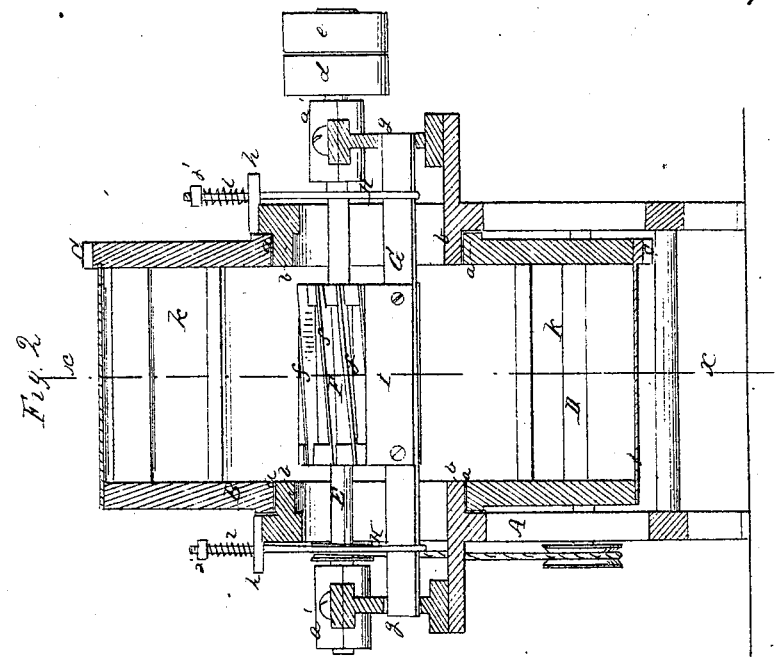
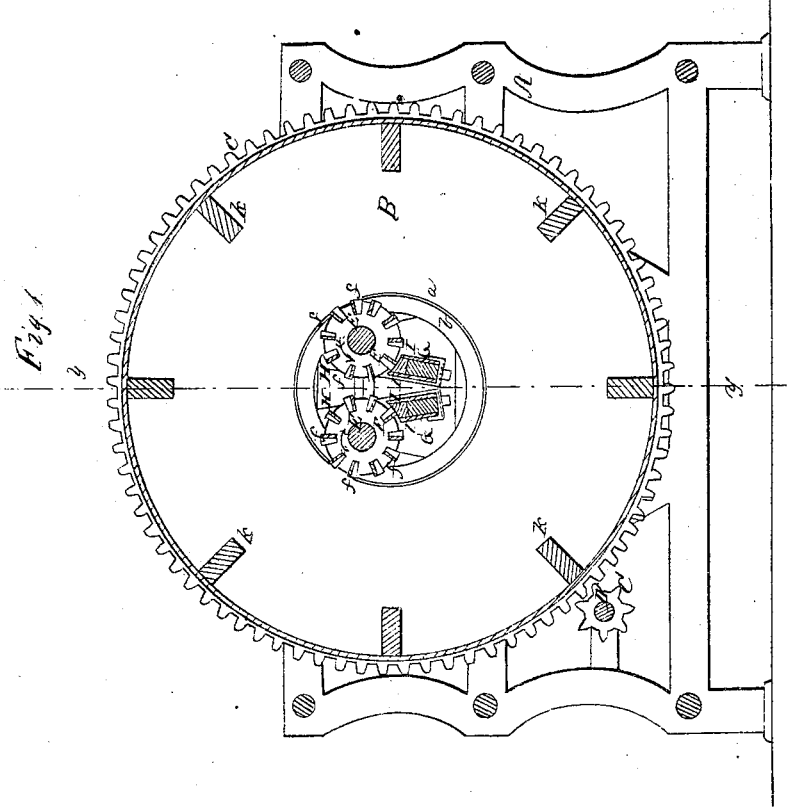

UNITED STATES PATENT OFFICE.

JOSEPH N. PITTS, OF BLACKSTONE, MASSACHUSETTS.

MACHINE FOR CUTTING FLOCKS AND PAPER-STOCK.

Specification of Letters Patent No. 14,165, dated January 29, 1856.

*To all whom it may concern:*

Be it known that I, J. N. PITTS, of Blackstone, in the county of Worcester and State of Massachusetts, have invented a new and Improved Machine for Cutting Flocks and also Rags for the Manufacture of Paper; and I do hereby declare that the following is a full, clear, and exact description of the same, reference being had to the annexed drawings, making a part of this specification, in which—

Figure 1, is a longitudinal vertical section of my improvement, (*x*), (*x*) Fig. 2, showing the plane of section. Fig. 2, is a transverse vertical section of ditto, (*y*) (*y*) Fig. 1, showing the plane of section.

Similar letters of reference indicate corresponding parts in the two figures.

The nature of my invention consists in the combination of two rotating cylinders having spiral knives upon their peripheries elastic and adjustable cutters placed underneath the cylinders and arranged as will be presently shown, and a rotating drum within which the cylinders and cutters are placed by which drum the material to be cut is fed to the cylinders and cutters as will be presently shown and described.

To enable those skilled in the art to make and use my invention, I will proceed to describe it.

A, represents a rectangular frame in which a drum B, is hung, said drum having an annular groove (*a*) in each side at its center in which grooves annular ledges or projections (*b*) on the inner sides of the frame A, fit, see more particularly Fig. 2, the ledges or projections forming the bearings of the drum. The drum B, has the periphery of one of its sides provided with teeth (*c*) in which a pinion C, on a shaft D, at the lower end of the frame A, gears, see Fig. 1.

E, E, represent the parallel shafts which pass transversely through the center, or nearly through the center of the drum B. These shafts have their bearings (*a'*) on the frame A, see Fig. 2. Each shaft E, has an idle and working pulley (*e*) (*d*) on its outer end, and each shaft has a cylinder F, upon it within the drum B. The peripheries of the cylinders F, F, have spiral knives (*f*) attached to them. The cylinders F, are nearly equal in length to the width of the drum B, as shown in Fig. 2.

G, G, represent two bars technically termed "ledger" bars. These bars pass transversely through the drum B, underneath the shafts E, E, the ends of the bars being fitted in slots (*g*) just below the bearings (*a'*) of the shafts E, E, see Fig. 2. The ends of each bar G, rest in loops at the lower ends of rods H, the upper ends of which pass through projections (*h*) on the upper part of the frame A, and have spiral springs (*i*) around them each rod having a nut (*j*) on its upper end above the springs, see Fig. 2. The "ledger" bars G, G, are slightly inclined or their upper ends are farther apart than their lower ends, as shown in Fig. 1, and the rods H, consequently have the same position.

To each side of each "ledger" bar G, there is attached a cutter I. These cutters are so arranged or placed that the spiral knives (*f*) on the cylinders F, as said cylinders rotate, will pass over the edges of the cutters I, there being a pair of cutters I, in contact with the knives of each cylinder, as clearly shown in Fig. 1. The cylinders F, F, rotate in the direction indicated by the arrows, see Fig. 1, and the drum B, may rotate in either direction. The internal periphery of the drum B, has projecting strips (*k*) attached to it.

The drum B, may be formed of cast iron or other material and solid or close sides are employed with the exception of circular openings at the center of the sides to allow the shafts E, E, and ledger bars G, G, to pass through. These openings may be covered by suitable plates attached to the sides of the frame A.

The rags or material to be cut is placed within the drum B, through a door placed in its periphery. The cylinders F, F, are rotated rapidly by belts passing around the working or fast pulleys (*d*) and the drum B, is rotated slowly by the pinion C, on the shaft D. The rags or other material passes down between the two cylinders E, E, and between the knives (*f*) on said cylinders, and the cutters I, I, and is cut by them, the material being acted upon by the knives and cutters similar to a pair of shears. The material is fed to the cylinders F, F, by the rotation of the drum B, the knives (*f*) catching the material and drawing it downward so that it passes between the knives and cutters. The material may be passed through or between the knives and cutters several times till it is cut sufficiently fine.

The cutters I, may be properly adjusted so that they may be placed nearer to or farther from the knives (*f*) by turning the nuts (*j*). The springs (*i*) allow the cutters I, to yield or give according to the amount of rags or flock passing between them and the knives.

Machines as at present constructed have but one cylinder of knives and one stationary cutter. These machines work slowly and imperfectly.

The within described machine will answer for cutting rags for paper stock equally as well as for cutting flock.

Having thus described my invention, what I claim as new and desire to secure by Letters Patent, is—

The combination of the cylinders F, F, provided with spiral knives (*f*) cutters I, I, attached to the adjustable and elastic or yielding bars G, G, and the drum B, the above parts being arranged as shown for the purpose specified.

JOSEPH N. PITTS.

Witnesses:
JAMES K. COMSTOCK,
JAMES E. SLATER.